United States Patent
Pombo et al.

(10) Patent No.: US 10,724,964 B1
(45) Date of Patent: Jul. 28, 2020

(54) MULTI-SENSOR TILED CAMERA WITH FLEXIBLE ELECTRONICS FOR WAFER INSPECTION

(71) Applicant: KLA-TENCOR CORPORATION, Milpitas, CA (US)

(72) Inventors: Pablo Pombo, San Ramon, CA (US); Kurt Lehman, Menlo Park, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/379,900

(22) Filed: Apr. 10, 2019

(51) Int. Cl.
  *G01N 21/95* (2006.01)
  *G01N 21/88* (2006.01)
  *H04N 5/225* (2006.01)

(52) U.S. Cl.
  CPC ..... *G01N 21/9501* (2013.01); *G01N 21/8806* (2013.01); *H04N 5/2253* (2013.01); *G01N 2201/061* (2013.01)

(58) Field of Classification Search
  None
  See application file for complete search history.

(56) References Cited

U.S. PATENT DOCUMENTS

| | | | |
|---|---|---|---|
| 2008/0079829 A1* | 4/2008 | Choi | H01L 27/14618 348/294 |
| 2013/0194445 A1 | 8/2013 | Brown et al. | |
| 2014/0049686 A1* | 2/2014 | Chen | H01L 27/14625 348/374 |
| 2016/0284490 A1* | 9/2016 | Kim | H01H 13/14 |
| 2018/0059033 A1 | 3/2018 | Zamek et al. | |
| 2019/0058814 A1* | 2/2019 | Jung | H05K 9/0024 |
| 2019/0208045 A1* | 7/2019 | Xie | H04B 1/3833 |
| 2019/0269009 A1* | 8/2019 | Park | H05K 1/0243 |
| 2019/0303640 A1* | 10/2019 | Song | G06K 9/0004 |

FOREIGN PATENT DOCUMENTS

| | | |
|---|---|---|
| KR | 20150032373 A | 3/2015 |
| WO | 2011080310 A1 | 7/2011 |
| WO | 2014093341 A1 | 6/2014 |

OTHER PUBLICATIONS

WIPO, ISR for PCT/US2019/061579, dated Mar. 13, 2020.

* cited by examiner

*Primary Examiner* — Fernando Alcon
(74) *Attorney, Agent, or Firm* — Hodgson Russ LLP (57) ABSTRACT

Sensor units can be disposed in a support member. Each of the sensor units can include a folded flex board having a plurality of laminations and an aperture and a sensor disposed in the folded flex board such that the sensor is positioned over the aperture. The system can be used in broad band plasma inspection tools for semiconductor wafers.

13 Claims, 6 Drawing Sheets

MULTI-SENSOR TILED CAMERA WITH FLEXIBLE ELECTRONICS FOR WAFER INSPECTION

FIELD OF THE DISCLOSURE

This disclosure relates to wafer inspection systems.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process induced failures, in some cases, tend to be systematic. That is, process-induced failures tend to fail at predetermined design patterns often repeated many times within the design. Elimination of spatially-systematic, electrically-relevant defects can have an impact on yield.

Each new generation of wafer inspection tools brings higher sensitivity and higher throughput. Increasing the throughput requires faster cameras, but also brighter light sources that can place more photons on a wafer in less time. Even if brighter light sources can be produced, such brighter light sources can have reliability or cost drawbacks. The cameras can help with this by increasing the number of time delay integration (TDI) stages (e.g., pixels used to integrate light for a given image) in a sensor. When the number of TDI stages is reached, multiple sensors can be tiled to better utilize the available field of view.

Previously, a single carrier electronics device to support multiple sensors was used. The common carrier approach does not allow for flexible integration of each sensor. Furthermore, alignment is done without live feedback because the camera cannot operate during alignment. This makes operation challenging. There also is a size limit as to how many sensors can be supported using a common carrier.

A detached sensor solution providing pig-tails or flexible media also was previously used. This cabling solution allow independent sensor mechanical manipulation, but does not provide a high-speed solution that can support high throughput camera requirements (e.g., more than 3 million lines per second). The number of connectors that need to be used can result in a larger volume implementation and reliability problems with the connectors.

Therefore, an improved camera for inspection of semiconductor wafers is needed.

BRIEF SUMMARY OF THE DISCLOSURE

A camera system is provided in a first embodiment. The camera system comprises a support member and a plurality of sensor units disposed in the support member. Each of the sensor units includes a folded flex board having a plurality of laminations, a sensor disposed in the folded flex board, a high-density digitizer disposed in the folded flex board, and a field programmable gate array disposed in the folded flex board. The folded flex board defines an aperture. The sensor is disposed in the folded flex board such that the sensor is positioned over the aperture.

The system can include, for example, three of the sensor units or six of the sensor units.

The sensor may be a time delay integration sensor.

The sensor can image 1536 pixels.

Two of the sensor units can be spaced apart by a distance from 5 mm to 7 mm.

A land grid array for the sensor can have a pitch of 1 mm.

The camera system can further include a processor in electronic communication with the sensor units. The processor can be configured to stitch images from the sensors.

A broadband plasma inspection tool can include the camera system of the first embodiment.

A method is provided in a second embodiment. The method comprises imaging a wafer with a plurality of sensor units disposed in a support member. Each of the sensor units includes a folded flex board having a plurality of laminations, a sensor disposed in the folded flex board, a high-density digitizer disposed in the folded flex board, and a field programmable gate array disposed in the folded flex board. The folded flex board defines an aperture. The sensor is disposed in the folded flex board such that the sensor is positioned over the aperture.

The method can further include stitching images from the sensors using a processor in electronic communication with the sensor units.

For example, three or six of the sensor units can be disposed in the support member.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein are directed to a camera architecture that supports multi-sensor integration in a single camera system with flexible electronics to allow optimal field of view utilization. This can maximize the light produced in tool. Many degrees of freedom are required for each sensor to support mechanical integration and individual alignment for optimal optical performance. Flexible electronics can provide mechanical independence for the individual sensors in tiled cameras while providing high quality substrate for high-speed electronics, chips, and interconnects. In the modular approach disclosed herein, every tile is considered a standalone camera. All electronic circuits required to operate each individual sensor are included in a tile block. The architecture decouples the opto-mechanical aspects of the design from the electronics required to operate the sensor. This allows full camera operation during individual alignment process.

Figure 1:
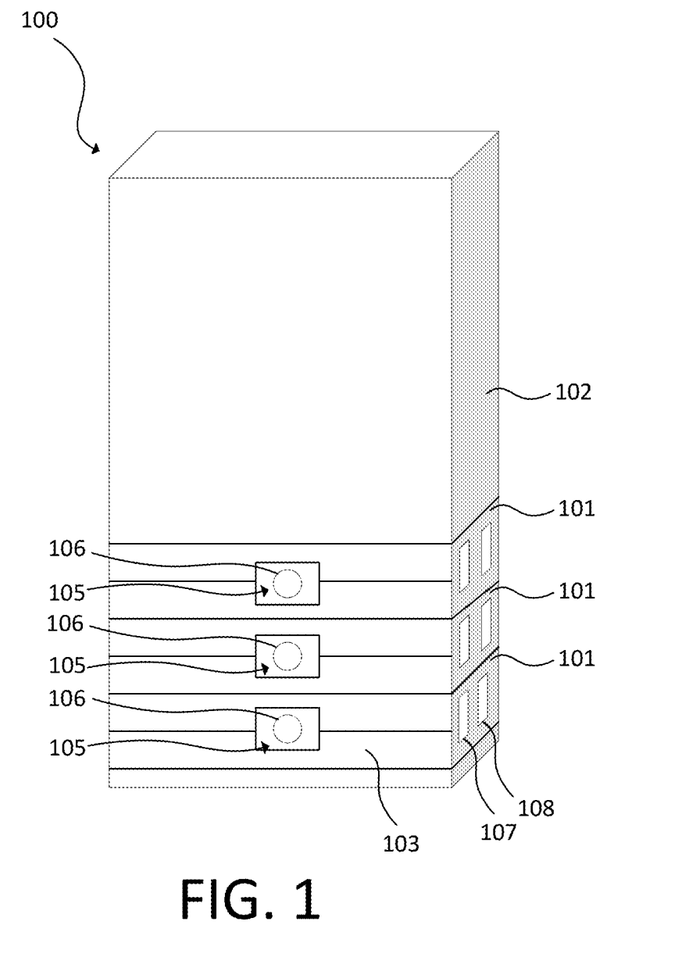
FIG. 1 illustrates a perspective view of an embodiment of a camera system in accordance with the present disclosure.
Figure 2:
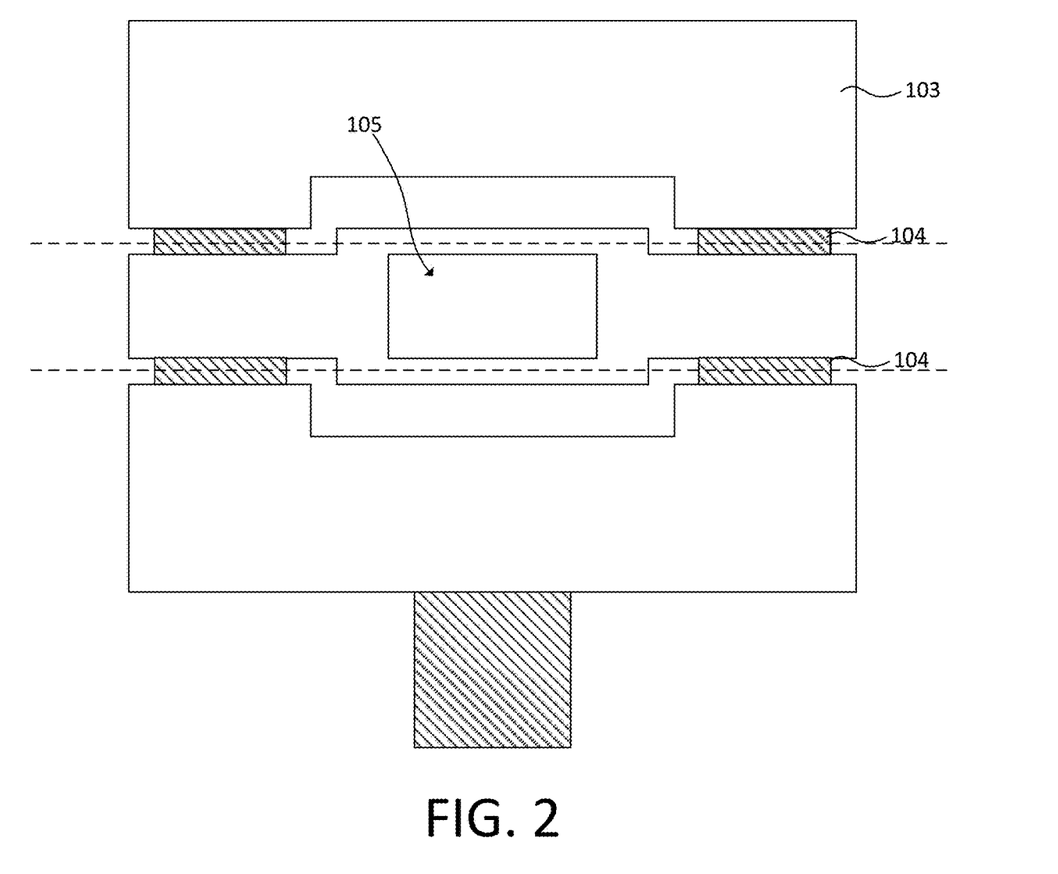
FIG. 2 illustrates an embodiment of a flex board in accordance with the present disclosure.
Figure 3:
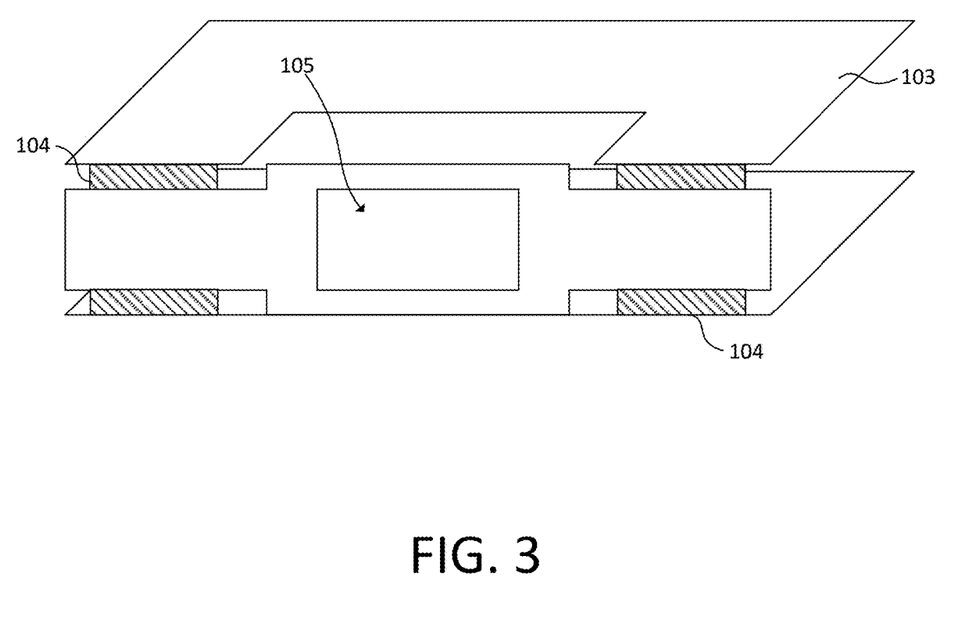
FIG. 3 illustrates an embodiment of the flex board of FIG. 2 when folded.

FIG. 1 illustrates a perspective view of an embodiment of a camera system 100. FIG. 2 illustrates an embodiment of a flex board 103. FIG. 3 illustrates an embodiment of the flex board 103 of FIG. 2 when folded. As seen in FIG. 1, the camera system 100 includes a plurality of sensor units 101 in a support member 102. Each sensor unit 101 includes a folded flex board 103 with laminations 104, such as that illustrated in FIG. 2. The laminations 104 may extend to or into rigid sections of the folded flex board 103. The laminations 104 may be internal layers of the flex board 103 that are laminated with rigid cores from the rigid sections of the flex board 103. For example, the laminations 104 can fold along the dotted line in FIG. 2 or elsewhere on the laminations 104. The flex board 103 also defines an aperture 105.

As seen in FIG. 1, a sensor 106 is disposed in the folded flex board 103 such that the sensor 106 is positioned over the aperture 105. The sensor 106 can be held to the aperture 105 using a mechanical interposer between the sensor package and rigid sections of the folded flex board 103 (e.g., land grid array (LGA) interfaces). In an example, the mechanical interposer can include approximately 2000 spring-based contacts to bridge across both LGA patterns. The assembly may be held in compression by screws from a front plate and a backing or pressure plate on an opposite side.

The sensor 106 can be a TDI sensor or another type of sensor. An LGA for the sensor 106 can have a pitch of 1 mm or other values.

In an instance, the sensor 106 can image 1536 pixels. The sensor 106 can be configured to image other ranges of pixels, and this is merely one example.

The sensor units 101 each also can include a high-density digitizer 107 and a field programmable gate array 108 disposed in the folded flex board 103. In an instance, the high-density digitizer 107 is part of the sensor 106. Thus, all the electronics to operate the sensor 106 can be included in the folded flex board 103. All sensor control (e.g., timing, gate driving) and processing (e.g., image calibration) electronics may be contained in or around the aperture 105 so the individual sensor 106 operation is contained in a single sensor unit 101.

Rigid flex technology with a high layer count can be used for the folded flex board 103, which can enable the compact form. In an instance, the flex cores of the folded flex board 103 are made of PYRALUX AP from DuPont, which is a flexible circuit material that includes an all polyimide, double-sided, copper-clad laminate, and the rigid cores are standard 370HR board material. Other materials for the flex cores or rigid cores are possible. All cores can be laminated together and the parts that only contain flex cores may be flexible. In an instance, the flex cores are not glued together in what is commonly known as "open book" design to allow for a small bending radius and better flexibility. The number of layers, the number of vias, and the size of the vias can increase complexity of fabrication for the folded flex board 103.

As seen in FIG. 1, three sensor units 101 can be included in the camera system 100. In another instance, the camera system 100 can include six of the sensor units 101. Other numbers of sensor units 101 are possible. For example, four or five sensor units 101 can be used.

While illustrated as adjacent, the sensor units 101 can be spaced apart by a distance from 5 mm to 7 mm.

Figure 4:
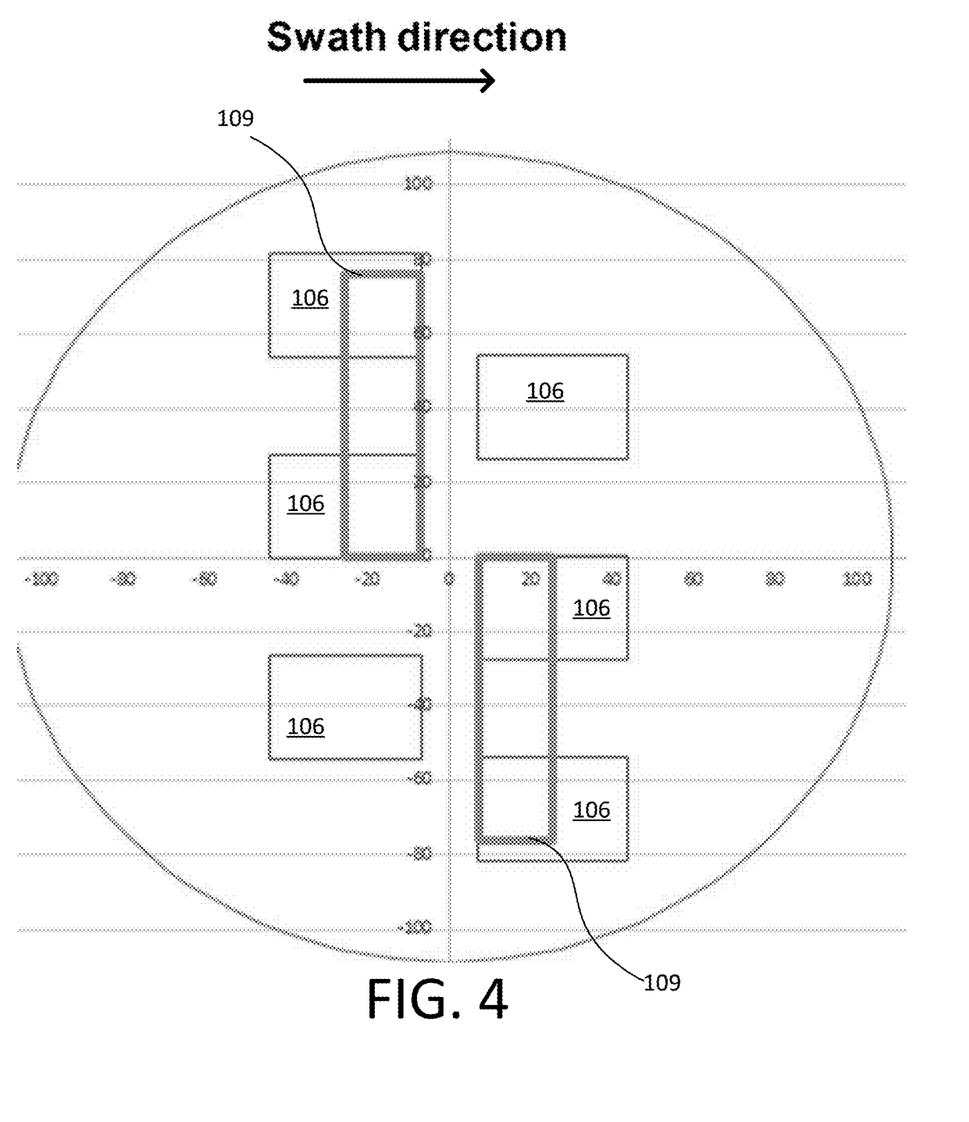
FIG. 4 is an optical representation of field of view.

FIG. 4 is an optical representation of field of view. Previously, two cameras were used. This is shown by the two vertical rectangles 109. The spacing of sensor units was constrained by the second camera (i.e., the second vertical rectangle 109) because all parts of the field of view in FIG. 4 need to be imaged. Now, six sensors 106 can be used. For example, two camera systems with three sensors 106 each can be used, but other numbers of sensors 106 are possible if there is no scanning gap. The sensors 106 disclosed herein have an overlap (e.g., an image is detected by two or more sensors) to stitch the images together. This provides better light utilization because with six sensors 106 more than twice the amount of light is imaged in the outer circle of FIG. 4 during the swath.

Tiles (e.g., sensors) can be laid out precisely to optimize image performance. This layout can create challenging electromechanical requirements for tile (e.g., individual sensor) package design and tile carrier board (e.g., flex board). This design minimizes the light wasted (e.g., not collected) and has no gaps in the swathing of the TDI sensor. There may be overlap between tiles to put the image back together.

There may only be approximately 6 mm of space between sensor packages. Smaller sensors, such as 1024 pixel sensors, may be used. For example, a 512 pixel sensor may be used and may allow more sensors to be included. These smaller sensors may be configured to have a package or routing space overhead to fit into camera system 100.

A larger sensor may be challenging to implement because the larger the sensor then the larger the space between sensor packages. Sensor yield decreases as the sensor increases in size, which impacts wafer occupation on the wafer used to produce the sensors.

The modular implementation disclosed herein allows individual mechanical manipulation while using camera to get live images. A sensor can be connected to a motherboard by a single connector in a flex circuit. This allows image collection during tile alignment. The embodiments disclosed herein can provide high reliability because multiple connectors are avoided when using a rigid-flex circuit board approach. Multiple connectors generally provide a point of failure.

Embodiments disclosed herein also provide a high-quality substrate in the form of the flex board 103 to sustain high-speed operation. Connector or signal breaks in the flex board 103 between the various rigid sections may be reduced or eliminated.

10 Gbps links can operate in this substrate. The tile carrier board stack-up can combine flex cores with laser drilled micro-vias that allow high quality designs for 10 Gbps links. Micro-vias can enable 10 G routing without via stubs.

By eliminating connectors, the embodiments disclosed herein are compact. When a cable connector solution is used, there can be a problem reducing the number of pins (e.g., more than 2000 connections per sensor) without the connectors occupying extensive space.

Figure 5:
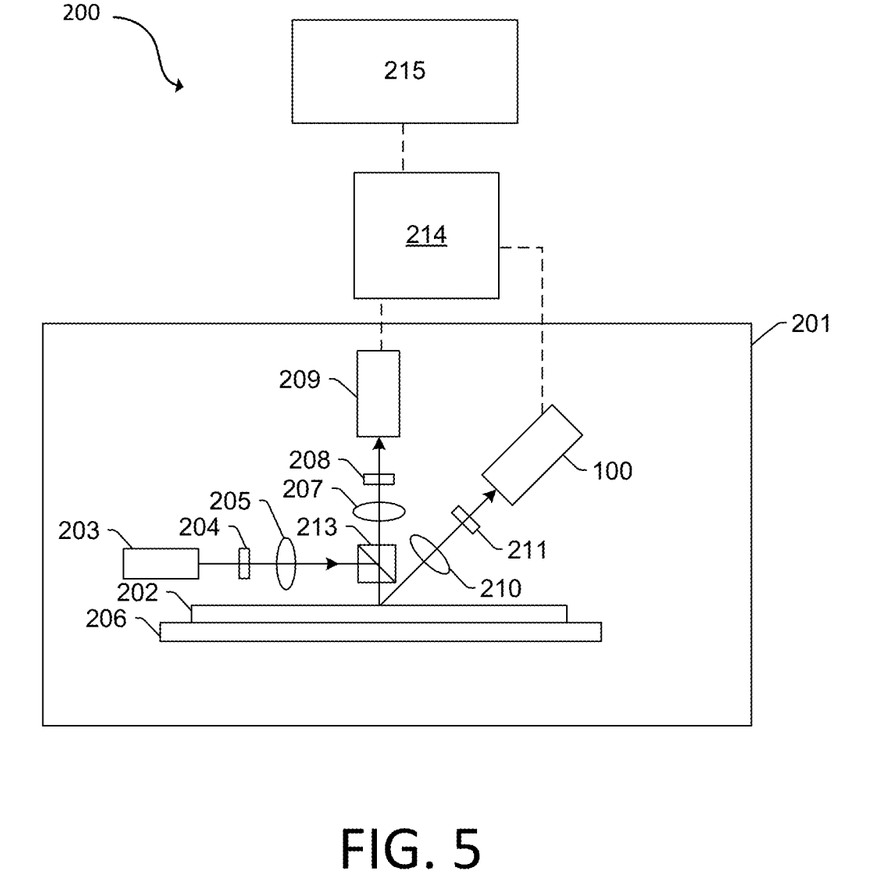
FIG. 5 is a block diagram of a system that includes the camera system of FIG. 1.

FIG. 5 is a block diagram of a system that includes the camera system of FIG. 1. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen includes a reticle. The reticle may include any reticle known in the art.

In the embodiment of the system 200 shown in FIG. 5, optical based subsystem 201 includes an illumination subsystem configured to direct light to specimen 202. The illumination subsystem includes at least one light source. For example, as shown in FIG. 5, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 5, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 5. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 5 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 5) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source, and the system 200 is a BBP inspection tool. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 5 as a single refractive optical element, it is to be understood that, in practice, lens 205 may include a number of refractive and/or reflective optical elements that in combination focus the light from the optical element to the specimen. The illumination subsystem shown in FIG. 5 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 5 includes two detection channels, one formed by collector 207, element 208, and detector 209 and another formed by collector 210, element 211, and camera system 100. As shown in FIG. 5, the two detection channels are configured to collect and detect light at different angles of collection. In some instances, both detection channels are configured to detect scattered light, and the detection channels are configured to detect light that is scattered at different angles from the specimen 202. However, one or more of the detection channels may be configured to detect another type of light from the specimen 202 (e.g., reflected light).

As further shown in FIG. 5, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and camera system 100 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 5 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and camera system 100 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 5 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 5 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), TDI cameras (such as those included in the camera system 100 of FIG. 1), and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 5 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope (SEM).

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 can be configured to stitch images from the sensors in the camera system 100.

An additional embodiment relates to a non-transitory computer-readable medium storing program instructions executable on a controller for performing a computer-implemented method for determining a height of an illuminated region on a surface of a specimen 202, as disclosed herein. In particular, as shown in FIG. 5, electronic data storage unit 215 or other storage medium may contain non-transitory computer-readable medium that includes program instructions executable on the processor 214. The computer-implemented method may include any step(s) of any method(s) described herein, including method 300.

Program instructions implementing methods such as those described herein may be stored on computer-readable medium, such as in the electronic data storage unit 215 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Figure 6:
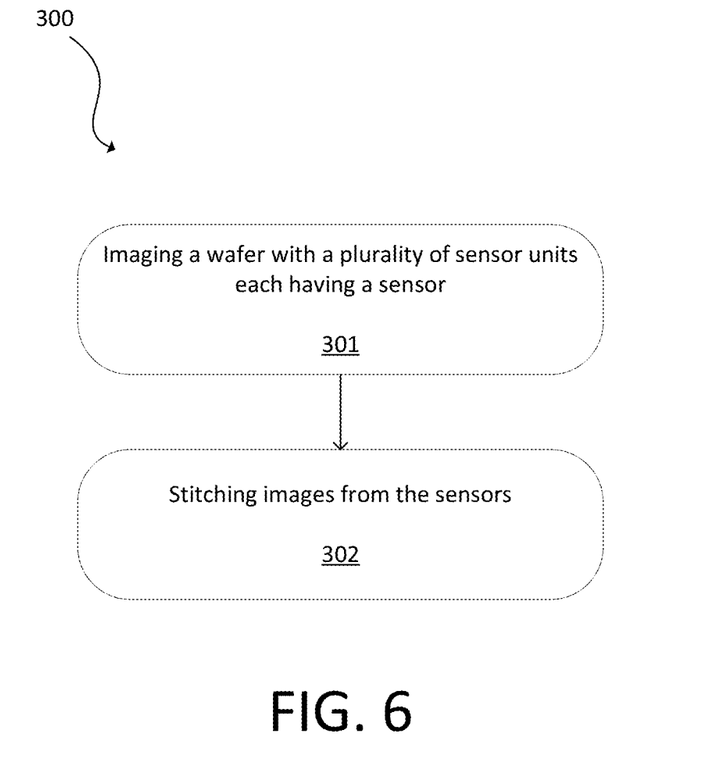
FIG. 6 is a flowchart of an embodiment of a method in accordance with the present disclosure.

FIG. 6 is a flowchart of an embodiment of a method 300. At 301, a wafer is imaged with sensor units. Each of the sensor units includes a folded flex board having laminations and defining an aperture; a sensor disposed in the folded flex board such that the sensor is positioned over the aperture, a high-density digitizer disposed in the folded flex board; and a field programmable gate array disposed in the folded flex board. There may be, for example, three or six sensor units disposed in the support member.

At 302, images from the sensors are stitched together using a processor in electronic communication with the sensor units.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A camera system comprising:
   a support member; and
   a plurality of sensor units disposed in the support member, wherein each of the sensor units includes:
      a folded flex board having a plurality of laminations, wherein the folded flex board defines an aperture;
      a sensor disposed in the folded flex board such that the sensor is positioned over the aperture;
      a high-density digitizer disposed in the folded flex board; and
      a field programmable gate array disposed in the folded flex board.

2. The camera system of claim 1, wherein the system includes three of the sensor units.

3. The camera system of claim 1, wherein the system includes six of the sensor units.

4. The camera system of claim 1, wherein the sensor is a time delay integration sensor.

5. The camera system of claim 1, wherein the sensor images 1536 pixels.

6. The camera system of claim 1, wherein two of the sensor units are spaced apart by a distance from 5 mm to 7 mm.

7. The camera system of claim 1, wherein a land grid array for the sensor has a pitch of 1 mm.

8. The camera system of claim 1, further comprising a processor in electronic communication with the sensor units, wherein the processor is configured to stitch images from the sensors.

9. A broadband plasma inspection tool that includes the camera system of claim 1.

10. A method comprising:
    imaging a wafer with a plurality of sensor units disposed in a support member, wherein each of the sensor units includes:
       a folded flex board having a plurality of laminations, wherein the folded flex board defines an aperture;
       a sensor disposed in the folded flex board such that the sensor is positioned over the aperture;
       a high-density digitizer disposed in the folded flex board; and
       a field programmable gate array disposed in the folded flex board.

11. The method of claim 10, further comprising stitching images from the sensors using a processor in electronic communication with the sensor units.

12. The method of claim 10, wherein three of the sensor units are disposed in the support member.

13. The method of claim 10, wherein six of the sensor units are disposed in the support member.

* * * * *